United States Patent [19]

Costin et al.

[11] Patent Number: 4,802,800
[45] Date of Patent: Feb. 7, 1989

[54] PASSIVE POSITIONING APPARATUS

[75] Inventors: Dinu Costin, New Hyde Park; Howard Citron, Northport, both of N.Y.

[73] Assignee: Robotic Vision Systems, Inc., Hauppauge, N.Y.

[21] Appl. No.: 105,560

[22] Filed: Oct. 5, 1987

[51] Int. Cl.[4] .................. B23C 9/00; B66C 23/00
[52] U.S. Cl. .................. 409/131; 409/241;
  414/730; 414/786; 901/8; 901/48
[58] Field of Search .............. 409/131, 132, 144, 218,
  409/231241, 235; 408/237–238; 414/786, 726,
  730, 729; 901/8, 30, 48, 41; 29/56.6, 56.5, 57

[56] References Cited

U.S. PATENT DOCUMENTS

| 3,561,398 | 2/1971 | Rose et al. | 901/8 |
| 4,178,834 | 12/1979 | Holmstrom | 409/239 X |
| 4,273,504 | 6/1981 | Shimatake et al. | 901/8 X |
| 4,541,770 | 9/1985 | Niinomi et al. | 414/730 |
| 4,726,732 | 2/1988 | Kato | 901/48 X |

FOREIGN PATENT DOCUMENTS

| 202648 | 9/1983 | Fed. Rep. of Germany | 409/241 |
| 218334 | 2/1985 | Fed. Rep. of Germany | 414/786 |
| 158741 | 9/1984 | Japan | 414/786 |
| 310293 | 10/1955 | Switzerland | 409/237 |
| 861061 | 9/1981 | U.S.S.R. | 901/48 |

Primary Examiner—William R. Briggs
Attorney, Agent, or Firm—Max Fogiel

[57] ABSTRACT

A method and arrangement for enhancing the ability of robots to perform precision assembly and machining employing adaptive clamping surfaces attached to the robot end effector in locations providing high mechanical advantage against working forces, and adaptive clamping foundations that become immobilized at the desired work location to form a local work foundation.

9 Claims, 5 Drawing Sheets

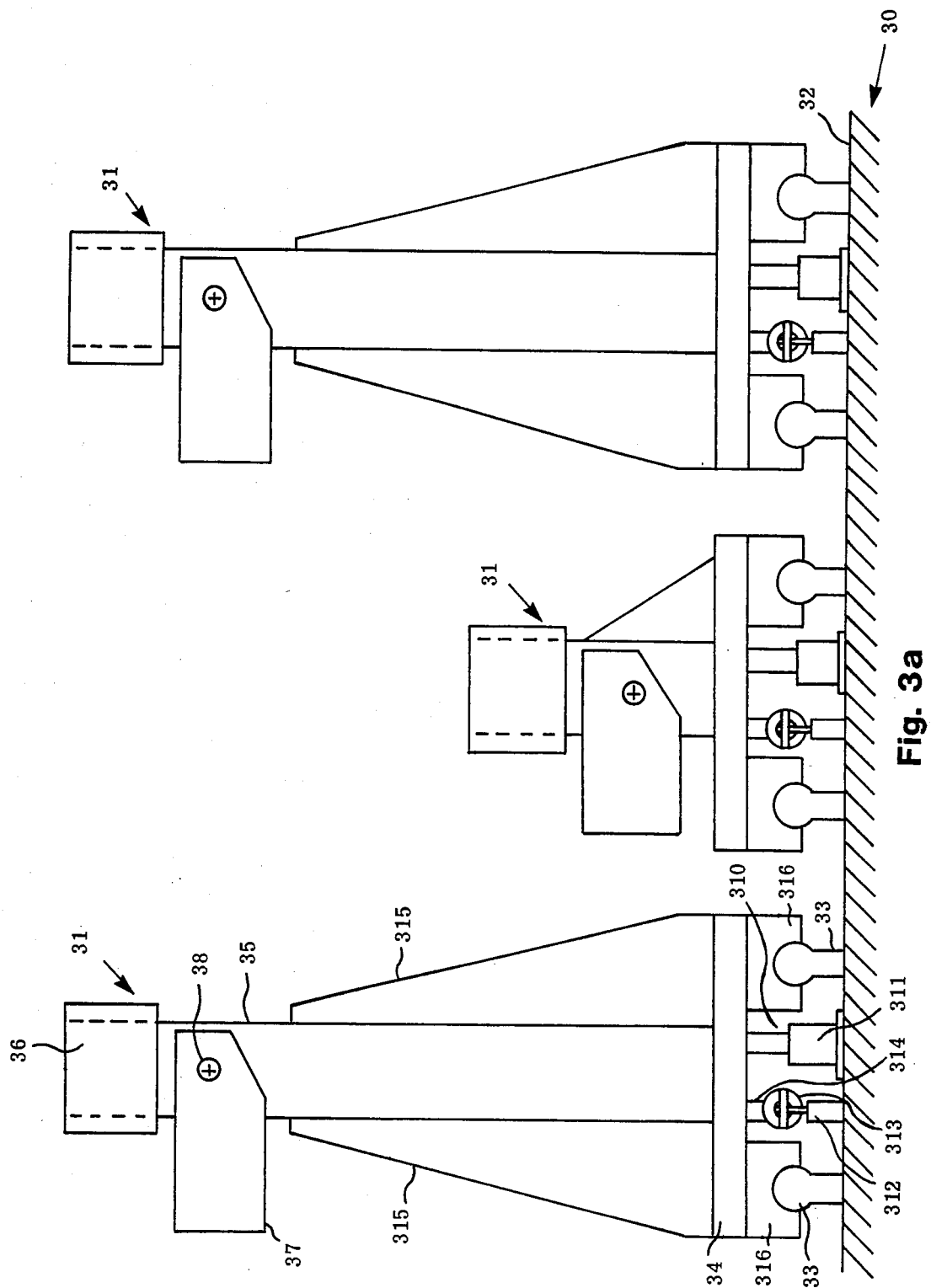

PASSIVE POSITIONING APPARATUS

BACKGROUND OF THE INVENTION

In order to obtain large robot reach with low weight and cost, many robot designs have evolved to provide long slender arms. These arms are very suitable for fast motion and entering constricted areas, and so have enjoyed high popularity. However, for precision assembly work they often prove to be inadequate due to excessive backlash and compliance as measured at the end of the robot arm. Also affected by the robots' lack of rigidity are machining operations performed by tools mounted to the ends of the robot arms.

In assembly work, an end effector mounted on the end of the arm is expected to pick up a part, place it precisely, and hold the part without movement while the part is fastened. The fastening process invariably produces forces on the part, and these forces are often of unknown magnitude and direction due to non-controllable conditions of the process. Any backlash and compliance in the robot arm, therefore, contribute to an increase in the production assembly positioning errors.

Where the robot is used in closed loop positioning of the part using machine vision or other feedback measurement, an arrangement is needed to remove, as much as possible, the positioning uncertainty during fastening. Once the part is guided to the correct location, the forces of fastening must be prevented from causing the uncertain movements allowable by the robot arm backlash and compliance.

It is also desirable to use a relatively low precision robot to coarsely position the part and use a high precision end effector to perform the final adjustment. The backlash and compliance of the robot, however, often precludes this approach. For the same reason, machining operations executed by end of arm tooling are limited in performance.

SUMMARY OF THE INVENTION

It is an object of the present invention to overcome the prior art disadvantage. In particular, it is the object of the present invention to provide a method and an arrangement, a passive positioner, for reducing the amount of motion that a part will sustain during a fastening or other force producing process in an automated assembly cell.

In keeping with this object and with still others which will become apparent as the description proceeds, the important characteristics of the invention are: low distortion of end effector, low position error allowed during fastening or other process, adaptation to all six degrees of freedom of the part to be fastened or mechanism to be positioned, and small errors introduced by the passive positioning device.

The present invention comprises the steps of engaging three points on a robot end effector with a position adaptive mechanism and rigidly locking the mechanism against movement during fastening of a part, or operation of a mechanism placed by the robot.

In a preferred embodiment of the invention, a position adaptive clamping arrangement comprises the following: three spherical appendages mounted on a robot end effector at widely spaced, non-colinear locations; clamping surfaces attached to the spherical surfaces; three clamping surfaces mounted on slideways to a foundation with those clamping surfaces positioned to meet the clamping surfaces attached to the end effector; spring mechanisms to maintain contact between the matching clamping surfaces; means for immobilizing the slideways, and means for clamping the end effector to the slideway clamping surfaces.

The invention provides the needed low compliance and absence of backlash by forcing all movable adjoining surfaces into pressured contact and keeping all cantilever lengths short. Adaptation to six degrees of freedom in positioning is obtained via a combination of flat and spherical mating surfaces.

Three non-colinear points on an object uniquely determine the location and orientation of the object. The more widely spaced and non-colinear, the more well defined is the location and orientation of the object for a given tolerance on each point location. By attaching three spherical surfaces to a robot end effector, it is possible to hold accurately the end effector against external forces. By placing the spheres widely apart and as non-colinear as possible, the ability of the holding mechanism to immobilize the end effectors is increased.

Blocks with conical cavities are placed on both sides of each sphere to captivate the spheres and provide a flat sliding and clamping surface. The blocks are coupled to each other with a force small enough to allow free turning of the spheres. The spherical joints thus formed allow rotation in any direction over limited angles, giving just three angular degrees of freedom. Flat clamping surfaces coming into contact with the flat surfaced blocks are free to slide in just two directions parallel to the blocks, leaving only one direction of movement constrained—the direction perpendicular to the block surfaces.

By providing compliance in the direction perpendicular to the blocks, the robot is free to position the end effector in six degrees of freedom. When the desired location is reached, the compiance in the direction perpendicular to the blocks can be removed by restricting further movement of the compliant device. The remaining five degree of freedom can then be removed by clamping the blocks tightly against the restrained compliant device.

If the compliant device is in contact with the blocks at the time it is restrained and the blocks come into initmate contact with the spheres when they are clamped, then no motion will be imparted to the end effector as a result of the clamping. This is essential in order to prevent additional errors from entering the final position result.

Once the end effector is immobilized, any forces upon the part held by the end effector are shunted to the foundation upon which the adaptive clamping arrangement is mounted, thereby isolating the forces from the robot. The adaptive clamping arrangement being close to the work location and not requiring great mobility can be made to possess greater rigidity than the robot which does not possess these design advantages. Thus the part can be held more precisely in the presence of working forces. Further, the end effector can comprise a machining or positioning mechanism and the adaptive clamping arrangement forms a rigid foundation for it when the arrangement enters its immobilized state. This effectively enhances the capability of any robot.

The invention will hereafter be described with reference to an exemplary embodiment, as illustrated in the drawing. However, it is to be understood that this embodiment is illustrated and described for the purpose of information only, and that nothing therein is to be considered limiting of any aspect of the invention.

BRIEF DESCRIPTION OF THE DRAWINGS

FIG. 3a is a front view of a passive positioner;

DESCRIPTION OF THE PREFERRED EMBODIMENT

Figure 1B:
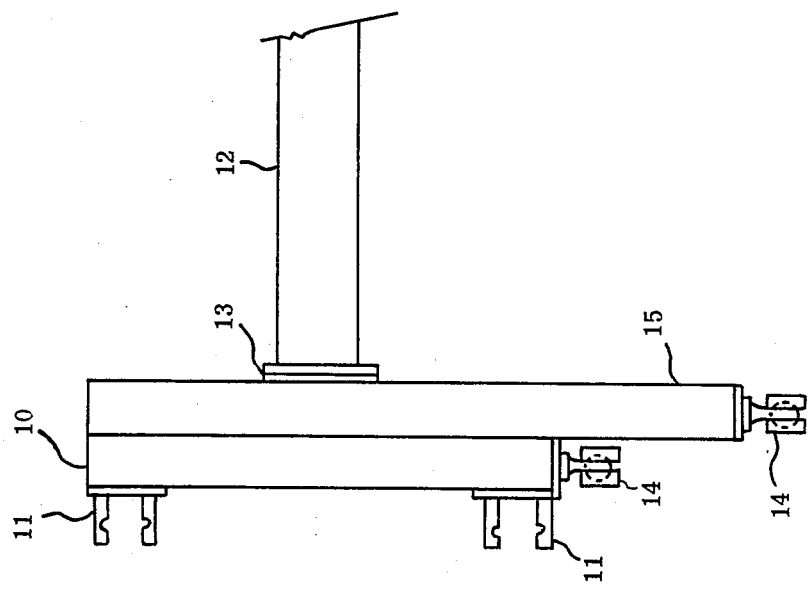
FIG. 1b is a side view of the end effector mounted to the end of the robot arm.
Figure 1A:
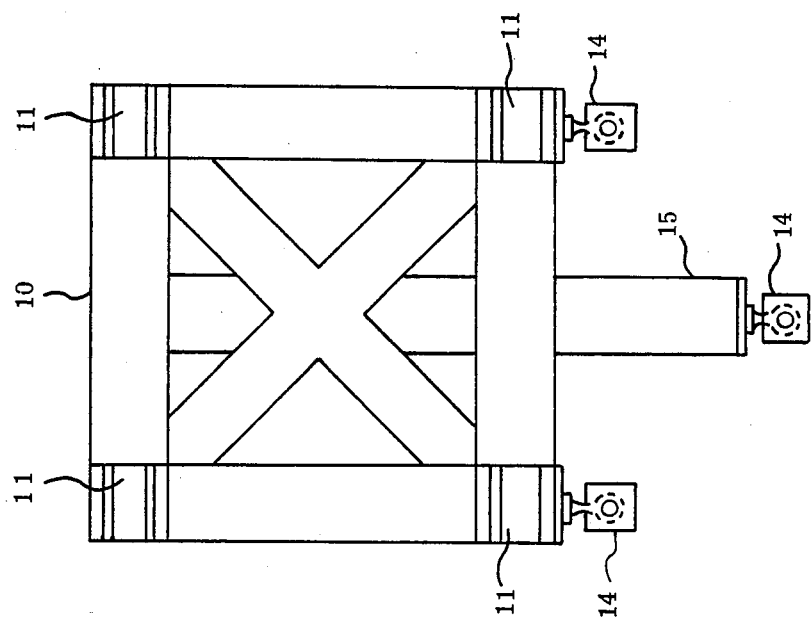
FIG. 1a is a front view of a typical robot end effector with a structural extension added to enable attaching three adaptive clamping surfaces.

FIG. 1a shows a front view of a typical robot end effector 10 designed to pick up a part with grippers 11. FIG. 1b provides a side view of the end effector 10 mounted to a robot arm 12 via coupling 13. Robots are often employed to precisely position a part against another part and then hold the part there while a fastening mechanism attaches the two parts. The fastening mechanism may be mounted on robot 12 or separate from the robot. However, in either case the forces generated by the fastening operation (or any other force generating activity) can cause the parts to mve relative to each other, resulting in an inaccurately-assembled unit (or an inaccurate process). This results from robot 12 not possessing sufficient rigidity to resist the fastening forces.

The part held by the robot 12 transmits the fastening forces through grippers 11, end effector 10, and coupling 13 to the robot arm 12. All of these components can be made sufficiently rigid, but the robot arm 12 may contain a wrist or movable joints that introduce backlash—a dead zone over which travel will occur with little applied force. The arm 12 also may be relatively long and slender allowing further deflection when fastening loads are applied.

In general, the base part to which the parts carried by robot 12 are fastened can be supported very rigidly and do not contribute to the problem. Where this is not true, the passive positioning concept of the present invention can be applied to the base part as well.

To provide an increase in rigidity at the end of the robot arm 12 during part fastening, the present invention provides an adaptive clamping mechanism called a passive positioner 30, illustrated in FIG. 3. To use such a mechanism without forcing the part out of its precisely-aligned position, adaptive clamping surfaces 14 have to be added to end effector 10.

The adaptive clamping surfaces 14 provide five degrees of freedom for clamping the end effector 10 and the passive positioner 30 provides the sixth degree of freedom to enable the system to clamp the end effector 10 in any orientation and position within the expected range introduced by process variations. It is essential that all six degrees of freedom of end effector 10 be allowed by the clamping system, and that the clamping system not introduce any force that could move the end effector 10 during the clamp up sequence.

The following description shall show that the present invention achieves these objectives. First, end effector 10 has added to it a strong structural member 15 to provide for mounting 3 adaptive clamping surfaces 14 on one side of end effector 10 when only one side is accessible. If the three clamping surfaces 14 can be mounted anywhere around the perimeter of end effector 10, then the added structural member 15 is not required.

Figure 2A:
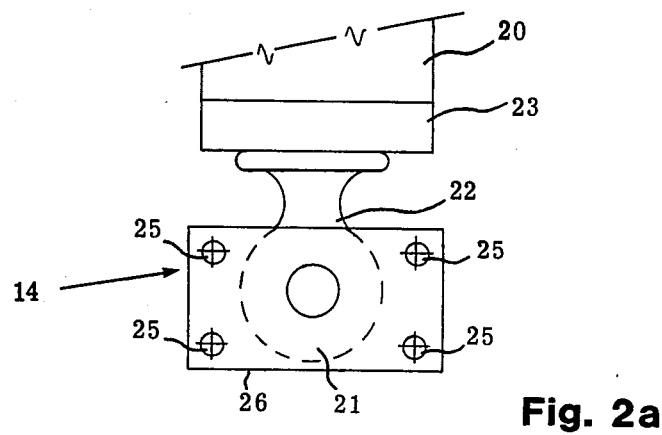
FIG. 2a is an enlarged front view of one of the adaptive clamping surfaces.
Figure 2B:
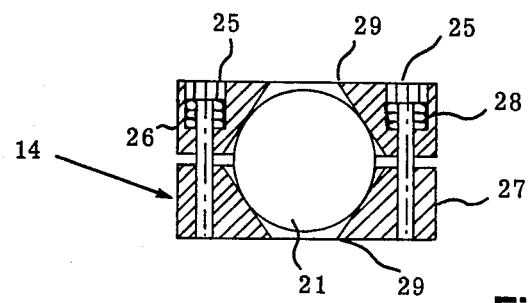
FIG. 2b is a bottom view of the adaptive clamping surface.

FIG. 2a provides a detail view of one of the adaptive clamping surfaces 14. It consists of a spherical ball 21 attached firmly to surface 20 via neck 22 and collar 23, and two clamping surfaces 26, 27 as illustrated in FIG. 2b. Clamping surfaces 26, 27 have opposing cavities 29, preferably conical in shape, for ease of manufacture as well as repeatably self-seating on sphere 21. Countersunk bolts 25 loosely hold plates 26, 27 together.

A spring 28 can be added beneath the head of each bolt 25 to maintain a light force of engagement between sphere 21 and plates 26, 27 at all times.

Adaptive clamping surfaces 14 should be spaced as widely apart as end effector 10 as possible to provide a large amount arm to resist torsional forces. Likewise, they should be placed as far from being colinear, for the same reason. Added structural member 15 achieves this effect when it is not possible to mount the third clamping surface 14 directly on the end effector 10.

Passive positioner 30 consists of three separate adaptive clamping mechanisms 31, shown in a front view of FIG. 3a, that come in contact with the adaptive clampings urfaces 14 on the end effector while the robot 12 positions a part to be fastened. Each mechanism 31 is similarly built. Linear slideways 33 are mounted to foundation 32.

Sliding table 34 is supported by the slideways 33, and they move approximately perpendicular to clamping surface 14 providing the sixth degree of freedom referred to above. A spring 313 in tension and connected between table 34 and foundation 32 via posts 314 and 312 respectively, maintains a force ont able 34 in the direction of sruface 14. The force may be obtained by any other compliant means such as a pneumatically-driven cylinder or negator motor.

A strong support 35, typcially with gussets 315 to increase rigidity are built upon table 34 to heights that match the locations of mating clamping surfaces 14 and 36.

Figure 3B:
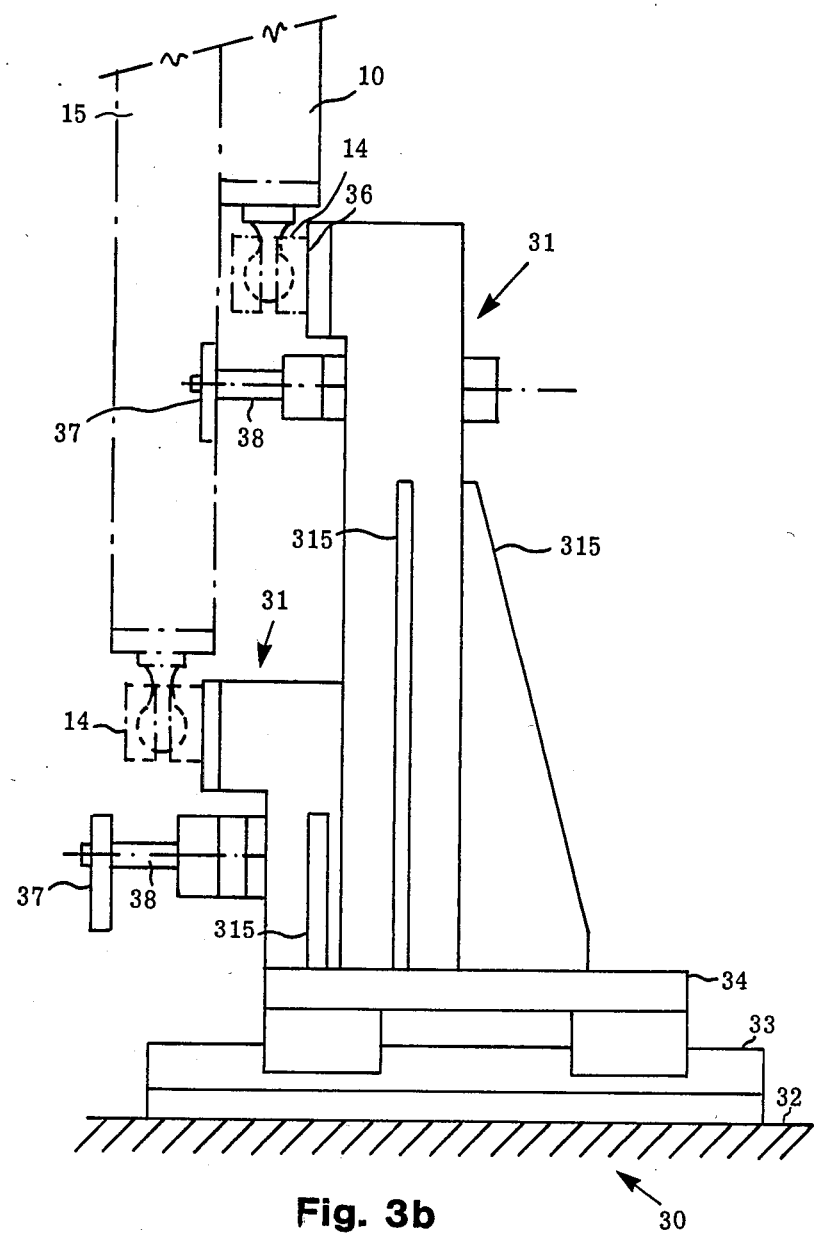
FIG. 3b is a side view of the passive positioner showing, in phantom, the unclamped adaptive clamping surfaces on the end effector.

FIG. 3b shows a side view of passive positioner 30 with a portion of end effector 10 with clamping surface 14, in phanton, against mating surface 36 of its respective adaptive clamping mechanism 31. Also shown in phantom is structural member 15 with its clamping surface 14 against its mating adaptive clamping mechanism 31.

Clamping of adaptive clamping surface 14 against surface 36 for each mechanism 31 is accomplished by rotating clamping surface 37 via shaft 38 and then pulling surface 37 via shaft 38 toward surface 36. When the robot 12 first brings end effector 10 into position, surfaces 37 are rotated down and out of the way as shown in the front view FIG. 3a, and side view FIG. 3b.

After the end effector 10 is positioned in the needed position to properly fasten the part carried by the end effector, it is desired to restrain movement of the part while the fastening takes place. It is, therefore, essential that no new forces be applied to end effector 10 that could be transmitted back to robot 12.

The force of the three compliant mechanisms 31 against the three mating surfaces 14 of end effector 10 is already applied. Surfaces 14, having 3 angular degrees of freedom and 2 linear degrees of freedom, will lie flat against surfaces 36 of passive positioner 30.

The sixth degree of freedom, the linear direction essentially perpendicular to surfaces 14, is removed first, by forcing a piston 310 via a hydraulic cylinder 311 (or equivalent) against the underside of each table 34. This immobilizes the sliding motion of each mechanism 31 without disturbing the position of end effector 10. Preloaded pillow blocks 316 assure small movement when this restraining force is applied.

Figure 3C:
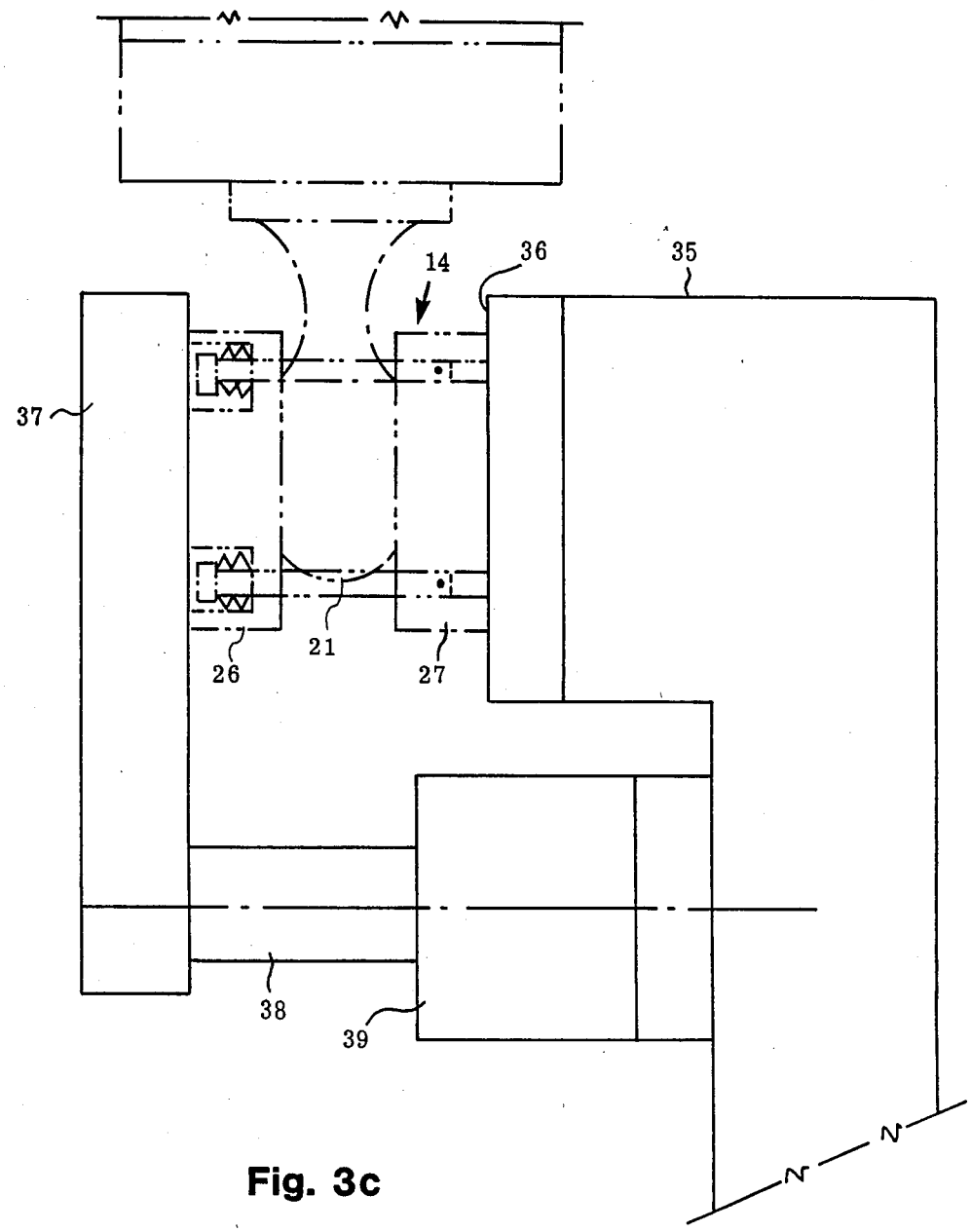
FIG. 3c is a detail of one of the clamps in the clamped position.

Once mechanisms 31 are immobilized, clamping surfaces 37 may be rotated as shown in a side view detail in FIG. 3c. A hydraulic motor 39 (or equivalent) rotates surface 37 via shaft 38 and draws surface 37 tightly against surfaces 14 which are already against surface 36 of support 35. A typical device to provide the rotation and clamping action is Vlier Model SC-1 Automatic Clamp Miniature Swinger. Spherical surface 21 will already be against plate 27 which is forced against surface 36 prior to clamping.

When surface 37 is brought against the remaining plate 26, that remaining plate 26 is driven against spherical surface 21 immobilizing the three angular degrees of freedom of the adaptive surface 14. The force of plates 37 and 36 against plates 26 and 27 immobilize the remaining two degrees of linear motion freedom (and rotation about the surface normal) providing a rigid support to end effector 10 without imparting any new force or motion to the end effector during the immobilizing procedure. All forces generated by fastening (or other force generating activity) pass mainly via the part to the end effector, to the passive positioner, and to the foundation effectively isolating the robot from these forces.

Since the passive positioner 30 mates with adaptive clamping surfaces 14 having a combined six degrees of freedom, total freedom of part placement is allowed, and the forces applied to the end effector 10 can be kept low; just enough force is required to keep the passive positioner surfaces 36 flat against clamping surfaces 14. Thus, distortion of the end effector 10 and, more importantly—the part which is firmly held by grippers 11, can be kept small.

A further benefit to be derived from the invention is that once the passive positioner has immobilized the end effector, the end effector can become a base from which force on the part can be applied. Robot 12 may not be capable of supplying sufficient force, resolution of movement, or accuracy of movement that is desired for part placement or machining.

Mounting a secondary positioning device or machining device on end effector 10 to position or machine the part after immobilizing the end effector avoids the robot 12 limitations including those brought on by backlash and compliance. Thus, lower performance, and hence lower cost, robots may now be readily employed in precision and/or heavy duty applications.

To increase rigidity in such applications, it may be necessary to add more clamping points. Because of alignment problems, having more than three clamping points can introduce distortion to the clamped mechanism. This, however, can often be tolerated, particularly in adaptive automation cells where position feedback, such as from machine vision systems, can identify the distortion errors, and provide compensated control signals to the secondary positioning or machining device to eliminate the effect of the errors.

The adaptive clamping surfaces 14 with mating adaptive clamping mechanisms 31 need not be aligned to a single plane as shown, but they may be at arbitrary angles. Further, fewer than three restraining points may be sufficient for a particular application where fewer forces are encountered. The rotating clamp 37 has been shown, since it provides straight-in access. This is not always necessary since the adaptive clamping surface 14 can be brought in sideways between surfaces 37 and 36 if clearance exists.

The invention has been described and illustrated with reference to an exemplary embodiment. It is not to be considered limited thereto, inasmuch as all modifications and variations which might offer themselves are intended to be encompassed within the scope of the appended claims.

What is claimed is:

1. A method for enhancing the ability of robots to hold the position of a part in the presence of external forces comprising the steps of: providing at least three non-colinear adaptive clamping surfaces on a robot end effector, said adaptive clamping surfaces being flat, each of said surfaces being substantially parallel to a plane and free to rotate about two axes mutually perpendicular to a normal to said plane; providing a mating flat clmaping surface for each said adaptive clamping surface, said mating surface being free to mvoe in a direction substantially perpendicular to said plane of said adaptive clamping surface; applying a compliant force to maintain said adaptive clmaping and mating surfaces in intimate contact during robot positioning; immobilizing said mating clamping surfaces; and clamping said adaptive clamping surfaces to said mating surfaces, said clamping totally immobilizing said end effector.

2. A method for providing a mobile base for machining and positioning mechanisms comprising the steps of: providing at least three non-colinear flat adaptive clamping surfaces on a machining or positioning mechanism, each of said surfaces being substantially parallel to a plane and free to rotate about two axes mutually perpendicular to a normal to said plane; providing a mating flat clamping surface for each said adaptive clamping surface, said mating surface being free to move in a direction substantially perpendicular to said plane of said adaptive clamping surface; applying a compliant force to maintain said adaptive clamping and mating surfaces in intimate contact during robot positioning; immobilizing said mating clamping surfaces; and clamping said adaptive clamping surfaces to said mating surfaces, said clamping totally immobilizing said mechanism relative to said mating surface.

3. An arrangement for increasing the rigidity of a robot arm at a work location comprising: at least three adaptive clamping means attached at non-colinear locations on a robot end effector, each said clamping means comprising:

a spherical surface with means for attachment; two flat plates captivating said spherical surface between said plate via cavities constraining thre linear degrees of freedom of said spherical surfaces relative to said plates, said plates being totally immobilzed relative to said spherical surface when clamping pressure is applied normal to said plate surfaces; and means for retaining said spherical surface captive by said plates when clamping pressure is absent;

and passive positioning means comprising:
   flat mating surfaces for each said adaptive clamping means; each said mating surface being mounted upon a separate sliding table; each said mating surface having clamping means for clamping said adaptive clamping means to said mating surface and being rotatable to provide clear means of approach of said adaptive clamping means to said mating surface; compliant means for forcing each said sliding table to maintain each said adaptive clamping means in contact with its respective said mating surface within range of each said sliding table; and means for immobilizing said sliding tables.

4. An arrangement for precision workpiece placement for robot arms, comprising: an arrangement as in claim 3 wherein said end effector is a precision positioning means.

5. An arrangement for providing a mobile machining foundation, comprising: at least three adaptive clamping means attached at non-colinear locations on a robot end effector, said end effector comprising a machine tool, each said clamping means comprising:
   a spherical surface with means for attachment; two flat plates captivating said spherical surface between said plates via cavities constraining three linear degrees of freedom of said spherical surfaces relative to said plates, said plates being totally immobilized relative to said spherical surface when clamping pressure is applied normal to said plate surfaces; and means for retaining said spherical surface captive by said plates when clamping pressure is absent;
and passive positioning means comprising:
   flat mating surfaces for each said adaptive clamping means; each said mating surface being mounted upon a separate sliding table; each said mating surface having clamping means for clamping said adaptive clamping means to said mating surface and being rotatable to provide clear means of approach of said adaptive clamping means to said mating surface; compliant means for forcing each said sliding table to maintain each said adaptive clamping means in contact with its respective said mating surface within range of each said sliding table; and means for immobilizing said sliding tables.

6. An arrangement for immobilizing an end effector when only one side is accessible, comprising: at least three adaptive clamping means attached at non-colinear locations on a robot end effector, each said clamping means comprising:
   a spherical surface with means for attachment; two flat plate captivating said spherical surface between said plates via cavities constraining three linear degrees of freedom of said spherical surfaces relative to said plates, said plates being totally immobilized relative to said spherical surface when clamping pressure is applied normal to said plate surfaces; and means for retaining said spherical surface captive by said plates when clamping pressure is absent;
passive positioning means comprising:
   flat mating surfaces for each said adaptive clamping means; each said mating surface being mounted upon a separate sliding table; each said mating surface having clamping means for clamping said adaptive clamping means to said mating surface and being rotatable to provide clear means of approach of said adaptive clamping means to said mating surface; compliant means for forcing each said sliding table to maintain each said adaptive clamping means in contact with its respective said mating surface within range of each said sliding table; and means for immobilizing said sliding tables;
and extension means from the accessible side of said end effector.

7. A method for enhancing the ability of robots to hold the position of part in the presence of external forces where six degrees of constraint are not required, comprising the steps of: providing at least one adaptive clamping surface on a robot end effector, said adaptive clamping surface being flat, each said surface being substantially parallel to a plane and free to rotate about two axes mutually perpendicular to normal to said plane; providing a mating flat clamping surface for each said adaptive clamping surface, said mating surface being free to move in a direction substantially perpendicular to said plane of said adaptive clamping surface; applying a compliant force to maintain said adaptive clamping and mating surfaces in intimate contact during robot positioning; immobilizing said mating clamping surface; and clamping said adaptive clamping surface to said mating surface, said clamping totally immobilizing said end effector.

8. A method for providing a mobile mounting base for maching and positioning mechanisms where six degrees of constraing are not required, comprising the steps of: providing at least one flat adaptive clamping surface on a machining or positioning mechanism, said surface being substantially parallel to a plane and free to rotate about two axes mutually perpendicular to a normal to said plane; providing a mating flat clamping surface for each said adaptive clamping surface, said mating surface being free to move in a direction substantially perpendicular to said plane of said adaptive clamping surface; applying a compliant force to maintain said adaptive clamping and mating surfaces in intimate contact during robot positioning; immobilizing said mating clamping surface; and clamping said adaptive clamping surface to said mating surface, said clamping totally immobilizing said mechanism relative to said mating surface.

9. An arrangement as defined in claim 3, wherein said passive positioner clamping means is non-rotatable.

* * * * *